July 20, 1965　　　　D. W. McLEAN　　　　3,195,444
MEANS FOR COLLECTING, COMPACTING, BANDING
AND WEIGHING A PLURALITY OF COILS OF ROD
Filed Sept. 27, 1963　　　　　　　　　　6 Sheets-Sheet 1

INVENTOR.
David W. McLean
BY
Russell, Chittick & Pfund
Attorneys

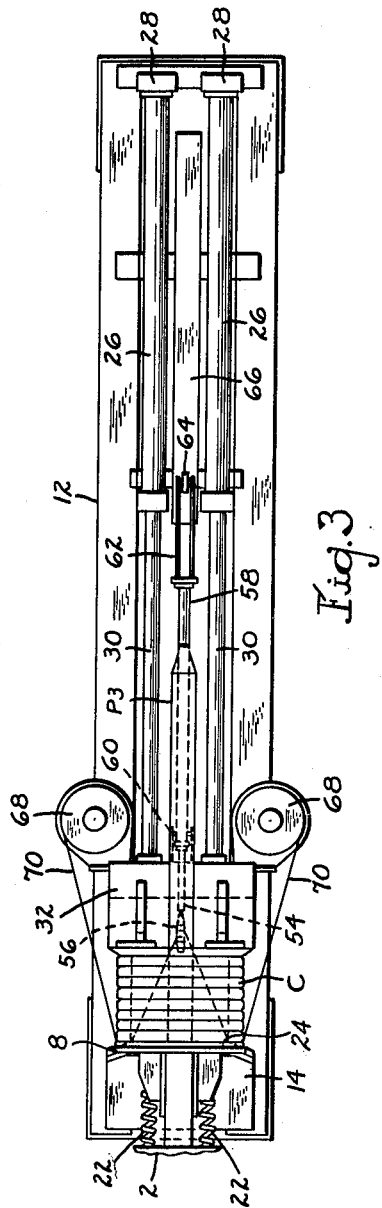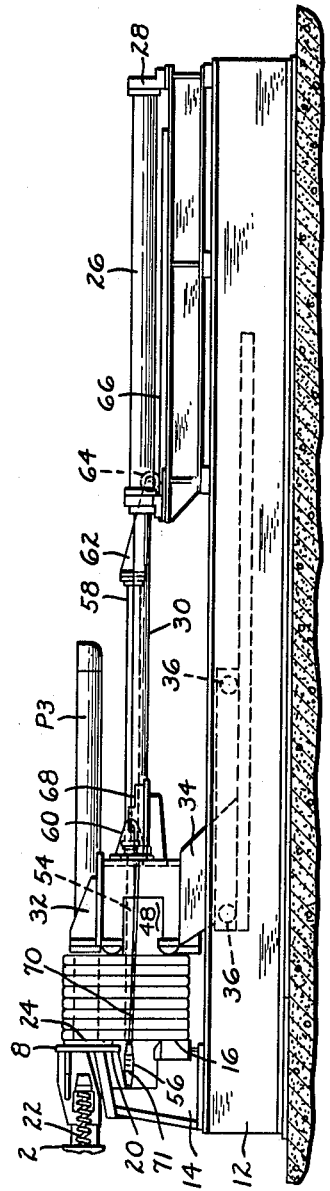

July 20, 1965
D. W. McLEAN
3,195,444
MEANS FOR COLLECTING, COMPACTING, BANDING
AND WEIGHING A PLURALITY OF COILS OF ROD
Filed Sept. 27, 1963
6 Sheets-Sheet 3
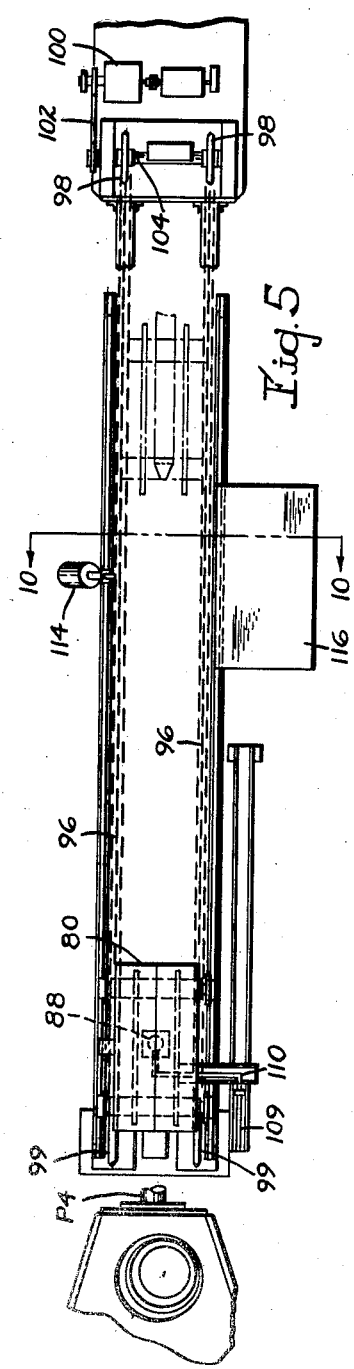
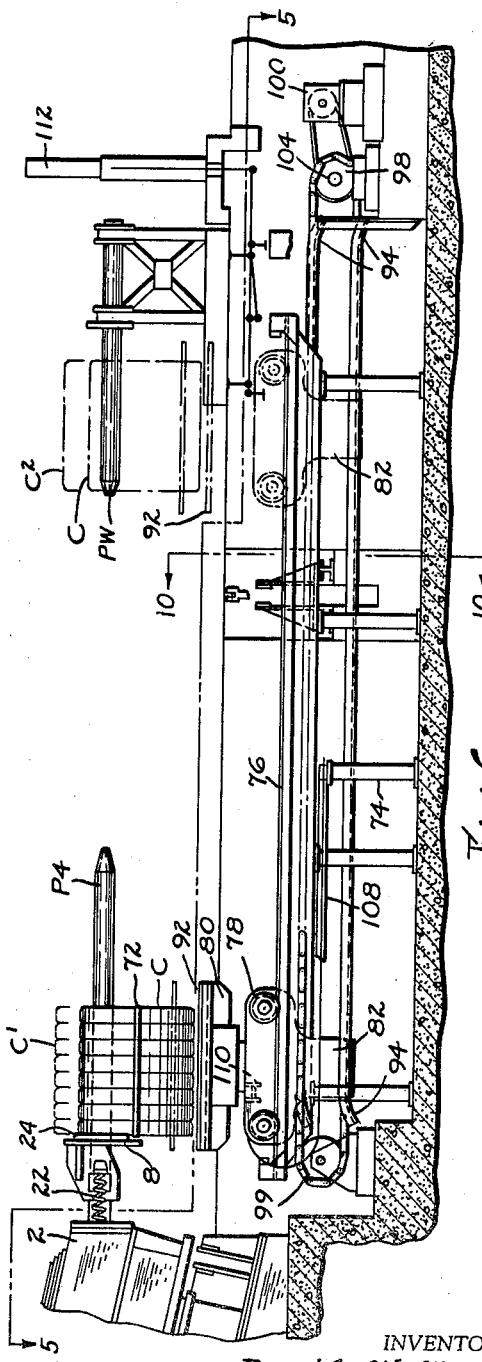
INVENTOR.
David W. McLean
BY
Russell, Chittick & Pfund
Attorneys July 20, 1965 D. W. McLEAN 3,195,444
MEANS FOR COLLECTING, COMPACTING, BANDING
AND WEIGHING A PLURALITY OF COILS OF ROD
Filed Sept. 27, 1963 6 Sheets-Sheet 4

INVENTOR.
David W. McLean
BY
Russell, Chittick & Pfund
Attorneys

INVENTOR.
David W. McLean
BY
Russell, Chittick & Pfund
Attorneys

United States Patent Office 3,195,444
Patented July 20, 1965

3,195,444
MEANS FOR COLLECTING, COMPACTING, BANDING AND WEIGHING A PLURALITY OF COILS OF ROD
David W. McLean, Hamilton, Ontario, Canada, assignor, by mesne assignments, to Morgan Construction Company, Worcester, Mass.
Filed Sept. 27, 1963, Ser. No. 312,022
11 Claims. (Cl. 100—7)

This invention relates to the art of material handling. More particularly, it relates to means for collecting a plurality of coils of metal rod, compressing them in an axial direction, and banding them together. After the banding operation, the coils may be weighed as a group and removed from the machine for subsequent disposition.

The invention may be used in conjunction with a conventional rod mill in which the rod is initially formed into individual coils at the end of the rolling operation. These coils are then transferred to a hook conveyor which transports them in succession to the collecting, compacting, banding and weighing means which comprises the present invention.

A principal object of the present invention is to provide a machine which is capable of collecting from a suitable hook conveyor a plurality of coils of rod, which coils preferably have been previously individually tied or banded at one or more points. The coils are initially gathered on a sloping pole and then compacted in an axial direction at a subsequent station while still on the pole. While held in compressed condition, the coils are banded together, preferably at diametrically opposite positions. While in this compact banded state, the coils at another station are removed from the pole, weighed and transferred to a position where they may be picked up by a crane for subsequent disposition.

Compacting and banding of coils of rod has been performed heretofore by other types of equipment, but the present construction enables these functions to be performed quickly, economically and in such manner that the resultant banded plurality of compressed coils is sufficiently secure for normal subsequent handling.

The construction of the present invention lends itself to compacting any selected number of coils up to the capacity of the machine. Thus it may compact and band a few coils or as many coils as may be received on the coil collecting pole.

Referring in general terms to the machine, there is a central rotating hub whose axis is tilted appreciably from the vertical. Extending radially from the hub are a plurality of poles spaced at equal angular distances from each other and at equal angles from the axis of the hub. The number of poles may be as few as three and perhaps as many as six or seven. However, satisfactory results are secured by using five poles, for with this number it is believed that a maximum number of coils can be handled in a given time. On the other hand, it is to be understood that the invention is not limited to the use of any particular number of poles.

The poles are arranged with respect to the axis of the hub so that as the hub rotates each pole goes through a position in which it slopes upwardly at a maximum angle. While in this position, the coils are placed on the pole. The hub is then rotated one step until the next pole comes into maximum upwardly sloping position, at which time a second group of coils is positioned on the second pole. Thus in step-by-step fashion, the poles move to the coil receiving position and in turn swing downwardly to subsequent positions, at which the coils are first compacted and banded and then removed and weighed.

Because of the tilted axis position of the hub, each pole, after leaving the coil receiving position, swings gradually downward through 180° rotation and then upward through the second 180° rotation. In so doing, each pole passes through two positions at which it is horizontal. While in the first horizontal position, the coils are compacted and banded. Then with the pole in the second horizontal position, the banded coils are removed from the pole and weighed. When five poles are used, the angularity of the poles with respect to the hub axis is set so that when one pole is in coil receiving position the two remote poles will be in horizontal position. In the design of the machine, it will be understood that the angle of the coil receiving pole to the horizontal should be sufficiently steep so that coils placed thereon will slide along the pole toward the hub until stopped by an abutment at the inner end of the pole.

During the compacting operation, two abutments are utilized against which the coils are pressed by the compactor. One of the abutments is fixed and immovable on the compactor bed. The other abutment is resilient, being mounted on the hub to rotate with its respective pole. When the resilient abutment is engaged by the coils as they are being compressed by the compactor, it moves for a limited distance in the direction of the hub, being stopped at a point where its face is aligned with the face of the fixed abutment. When the coils are being compacted, they may hang directly on the pole or, preferably, they may be raised slightly by vertically movable skids located beneath the coil position. After the coils have been compacted fully, they are banded, usually at two opposite positions, but it will be understood that the number of bands may be varied as required. When the compactor is withdrawn, the skids (preferably wood surfaced for long life and protection of the coils) are lowered to re-deposit the coils on the pole. In the meanwhile, the resilient abutment returns to its original uncompressed position and in so doing pushes the now-banded coils outwardly along the pole for a distance great enough so that as the hub and pole are then rotated to the next position the innermost coil of the banded group will clear the corner of the fixed abutment, thus preventing any damage to the innermost coil. Likewise, as the initially collected coils on the sloping pole are swinging from uppermost position downwardly to horizontal compacting position, they will be held by the resilient abutment far enough out on the pole so as to pass the corner of the fixed abutment as the pole swings into horizontal position.

Another object of the invention is to provide means which will assist in the banding of the compacted coils. It will be appreciated that where, for example, eight coils of rod lying side-by-side on the pole are to be compacted and banded, the resulting bundle will be of such axial length that complete automatic banding will be difficult of attainment. Thus in the present construction it is contemplated that some manual operations will be performed in the banding operation, particularly the final tightening, securing and clamping together of the band ends. However, the invention contemplates the provision of mechanism capable of drawing the banding material through the centers of the compressed coils so that the subsequent manual operations may be readily performed with the aid of pneumatic hand tools.

The machine also includes mechanism in the form of a stripper car which, when the pole is in horizontal stripping position, will rise beneath the banded coils to lift them free of the pole and then move them axially off the pole, carrying them to a weighing station, at which point the coils are lowered to rest on another pole which is part of the weighing mechanism. After weighing has been accomplished, the stripper car again rises to lift the coils off the weighing pole and carry them to a position between the two poles, at which point, by suitable means, the banded coils are removed transversely from the car to a position where they may be readily handled by a crane to go to storage or shipping.

These and other objects of the invention will become more fully understood as the description proceeds with the aid of the accompanying drawings in which:

FIG. 3 is an enlarged plan view showing the coils in compacted position and the banding operation partially completed;

FIG. 4 is a side elevation of FIG. 3, except that the banding head is in extended position;

FIG. 5 is a plan view taken approximately on the line 5—5 of FIG. 6 showing the stripper car but with the poles, coils and weighing means removed for clarity;

FIG. 6 is a side elevavtion of FIG. 5 with the poles and compacted coils ready for commencement of the stripping operation;

Figure 1:
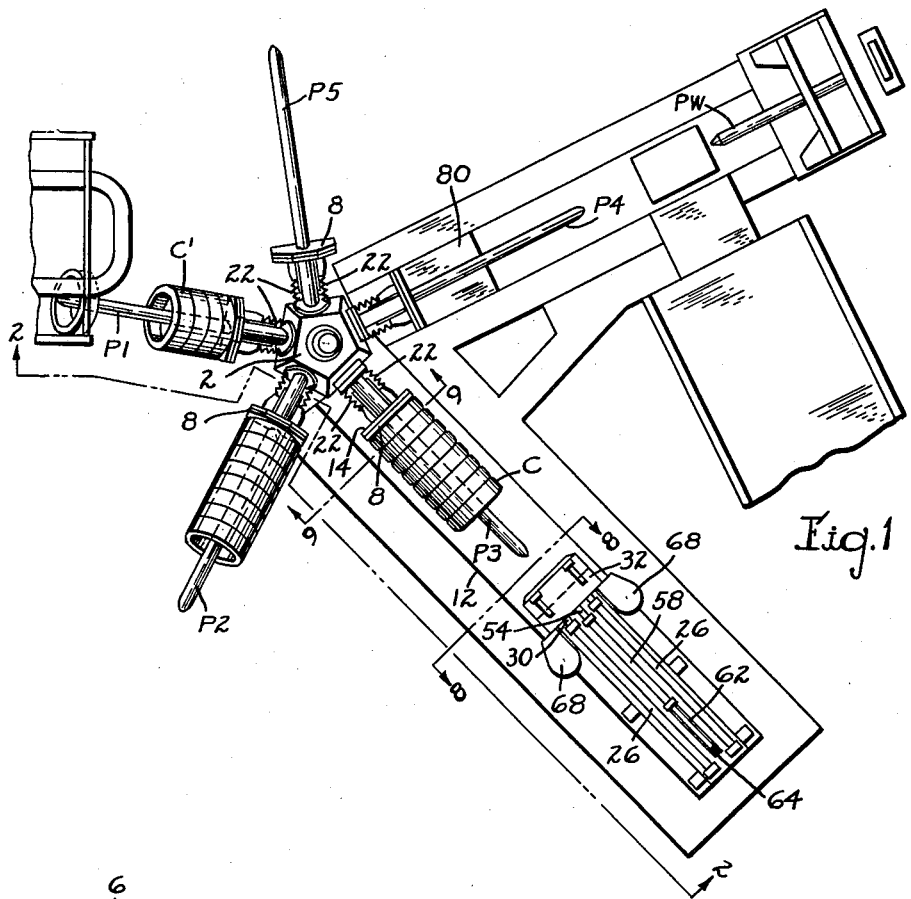
FIG. 1 is a plan view of the machine in which five poles are utilized.
Figure 2:
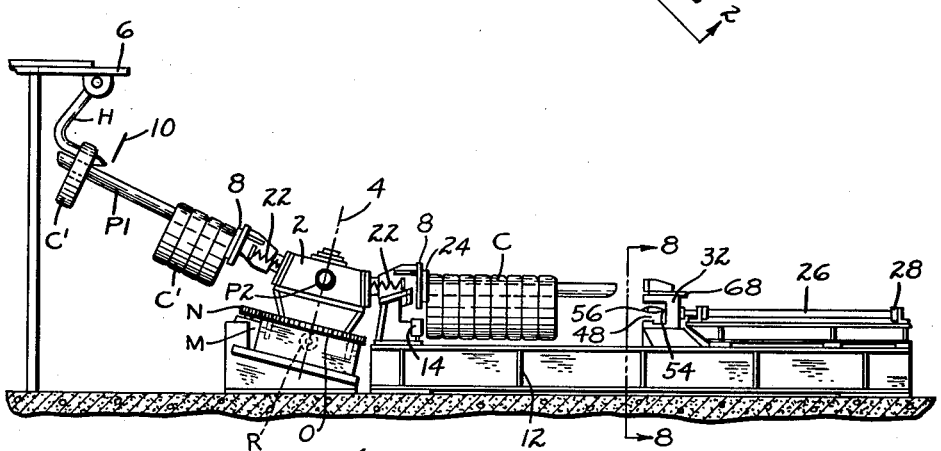
FIG. 2 is a side elevation taken on the line 2—2 of FIG. 1.

Referring first to FIGS. 1 and 2, the machine comprises a rotatable hub 2, the axis 4 of which is at an angle to the vertical. Through the use of well known mechanisms, such as suitable supporting bearings and motor driven gearing, and through the use of controls which may be either manually or automatically operated, the hub 2 may be rotated step-by-step. Illustrative of one means for driving hub 2, there is shown in FIG. 2 rollers R which support the rotatable elements. A motor M through reduction gearing (not shown) drives pinion N which in turn drives the large gear O connected to the hub 2. In the form shown, the hub carries five poles, P1, P2, P3, P4 and P5. These poles are spaced from each other by equal angles of 72°, and each pole is at an angle somewhat greater than 90° to the hub axis 4. The angularity of pole P1 to the horizontal, as can be seen in FIG. 2, is such that when a rod coil, such as C1, is released thereon from the hook H of the coil carrying conveyor 6, the coil will slide by gravity down pole P1 to rest against resilient abutment 8 at the inner end of the pole. It should be mentioned that the conveyor 6 and hook H which function to deposit the coils on pole P1 are old and well known constructions and need not be explained in further detail here. Suffice it to say that so long as pole P1 remains in the position shown successive coils brought thereto by the conveyor 6 will be deposited thereon. When a sufficient number of coils has been deposited on pole P1, hub 2 will be rotated one step so that pole P1 will move to position P2, as viewed in FIG. 1, and pole P5 will move to position P1, where the pole P5 will then receive from hook H a second group of coils C.

The tilt of the hub axis 4 and the angularity of the poles P to the hub axis is such that when the poles are in the positions P3 and P4 they will be horizontal. As the poles move from position P3 to P4, they dip below the horizontal, but the maximum downward angle of slope between these two positions is so slight that the collected and banded coils will not shift their position outwardly on the pole.

As mentioned previously, the invention is not to be limited to the use of five poles P. It can work as well with three, four, six or seven poles. Five poles, however, have been selected, as they present a construction in which the angular spacing of 72° between poles presents sufficient room for the compactor and unloading stations and the transit time between the step-by-step positions ties in well with the normal rate of delivery of coils from the conveyor 6.

By considering the sequence of operations applicable to one pole, a complete understanding of the operation of the machine may be obtained, as the same sequence is applicable to all of the other poles.

Referring to FIGS. 1 and 2 again, a predetermined number of coils C are collected on pole P1. As shown in the drawings, it has been determined that eight coils are to be collected, compacted, banded and then removed for weighing and disposal.

As the coils leave the hook H to slide down pole P1, they pass a count probe 10 (see FIG. 2) designed to advise the operator in advance when the selected number of coils, herein shown as eight, have been deposited thereon so that controls, manual or automatic, can be actuated to cause rotation of hub 2. When the hub is rotated, it moves smartly for one step with the pole P1 stopping at position P2 and pole P5 stopping at position P1 to collect a second ground of eight coils. As soon as this is accomplished, the next step of rotation of hub 2 takes place, and pole P1 arrives at position P3. Here the pole is horizontal and has the eight coils hanging thereon, with the innermost coil resting against the resilient abutment 8. It is in this position P3 that the compacting and banding of the coils takes place. The machinery for accomplishing this result will now be described.

Figure 7:
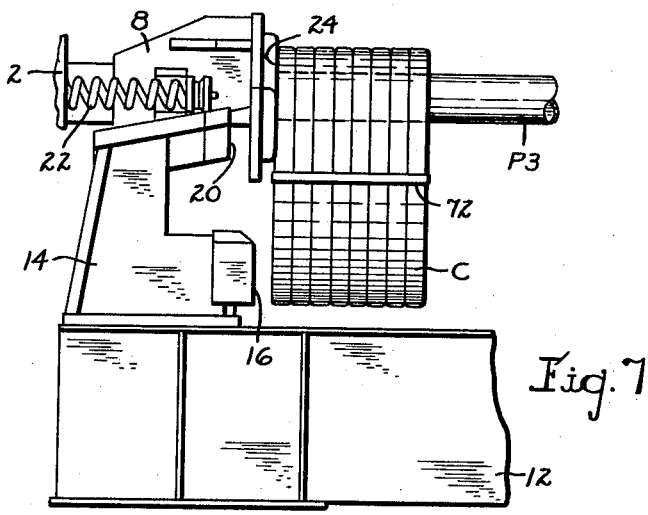
FIG. 7 is an enlarged fragmentary side elevation of the left end of FIG. 4 showing the position of the banded coils after withdrawal of the compactor in which the resilient abutment has pushed the coils away from the lower fixed abutment.

A compactor base 12 extends under and is aligned with pole P3. At the end of base 12 adjacent hub 2 is a fixed abutment 14, details of which may best be seen in FIGS. 7 and 9. This fixed abutment has a lower transversely extending face 16 which is at right angles to the axis of pole P3. The sides of face 16 terminate in beveled portions 18 to facilitate passage of the coils C thereby as the pole is approaching and leaving station P3. Abutment 14 has an upper fixed transversely extending face 20 parallel to face 16 but set inwardly therefrom. This upper face 20 acts as a stop against which the rear of the resilient abutment 8 will engage when forced toward the hub by the compacting mechanism. The resilient abutment 8 is normally maintained in extended position by a pair of heavy coil springs 22 having their inner ends supported by hub 2. These springs are of sufficient strength to force the resilient abutment and the compressed and banded coils outwardly along pole P3 after the completion of the banding operation as shown in FIG. 7.

Figure 9:
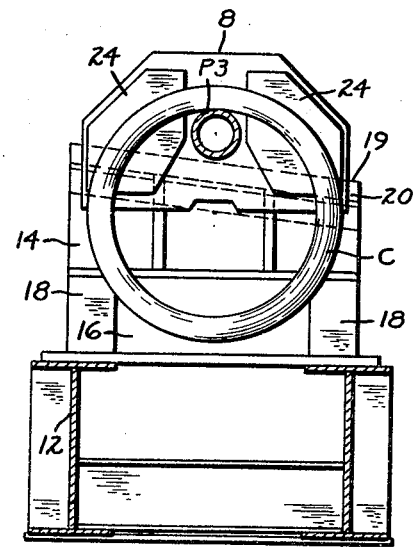
FIG. 9 is an enlarged vertical section on the line 9—9 of FIG. 1.

In FIG. 9, it will be noted that the upper surface of the fixed abutment 14 slopes downwardly from left to right as indicated at 19, and as a result the surface 20 is likewise of sloping character. The reason for this slope is to provide suitable clearance for the pole as it moves from position P2 to position P3 and thence on to position P4. In this part of its travel, the pole is traveling in a downwardly sloping plane, which plane is substantially parallel to the surface 19. By this arrangement, interference with the pole is avoided, while at the same time providing an adequate fixed abutment surface 20 against which the movable resilient abutment 8 engages when forced backwardly by the pressure of coils C thereagainst under the compressing effect of compactor 32.

The upper resilient abutment 8 has two faces 24, as can be seen in FIG. 9, and these two faces, plus the fixed lower face 16, serve as the stationary elements against which the compacting member forces the coils C during the compacting operation.

The coil compressing or compacting means can best be seen in FIGS. 1, 2, 3 and 4. A pair of horizontal hydraulic cylinders 26 are mounted on frame 12 with their rear ends fixed at 28. Pistons 30 are connected to the rear of a compactor 32 so that the latter may be moved back and forth under the influence of the pistons. The compactor is supported by a carriage 34 mounted on wheels 36 which run on tracks 38 (see FIG. 8).

Figure 8:
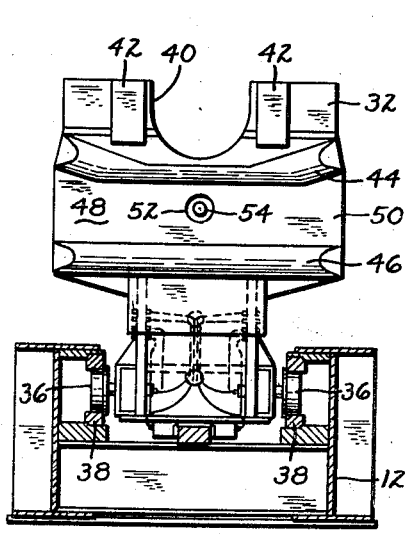
FIG. 8 is an enlarged vertical section on the line 8—8 of FIG. 1.

The face of compactor 32 may be seen in FIG. 8. The unit is cut away at the upper center at 40 to provide an area through which the pole P3 passes. Adjacent are two flat pads 42 which engage the upper part of the outermost coil and two transversely extending faces 44 and 46. These areas 42, 44 and 46 all lie in the same vertical plane so as to press uniformly on the adjacent coil. As can be seen in FIG. 4, in side view, compactor 32 is generally in the shape of a C, the purpose of which will appear later. The open area within the C is designated 48 in FIGS. 4 and 8.

In the wall 50 at the rear of area 48 is an opening 52 through which extends a piston 54 having on its outer end a banding head 56. Piston 54 is actuated to move outwardly from and back toward opening 52 through its cooperation with a banding cylinder 58. This cylinder is secured to the compactor 32 at 60 so as the compactor 32 moves back and forth under the influence of pistons 30 so will cylinder 58 move with it. The rear end of cylinder 58 is supported by a sloping leg 62 having on its end a roller 64 which rides on a flat track 66.

Piston 54 is movable from a position with the banding head 56 retracted in space 48, as shown in FIG. 2, to an extended position in which, after advance of compactor 32, it is within the confines of fixed abutment 14, as can be seen in FIG. 4.

With the pole in position P3 and the required number of coils hanging thereon, as shown in FIGS. 1 and 2, the cylinders 26 are put in operation to force compactor 32 toward the hub 2 to engage the outermost of the coils C and to compress them from their normal configuration to a greatly reduced length, as shown in FIGS. 3 and 4. As soon as the coils have been (or while they are being) compressed, the piston 54 is extended to pass through the coils until the banding head 56 reaches the position shown in FIG. 4. Two operators, standing on opposite sides of the compressed coils, then draw from the banding coils 68 on either side of the compactor 32 substantial lengths of banding material or strapping 70. The ends of the two potential bands 70 are then inserted individually in appropriate receiving and gripping apertures 71 on either side of the banding head 56. The piston 54 is then retracted so that the banding material 70 is pulled back through the center of the compressed coils in the manner shown in FIG. 3. The two operators may then reach into the area 48 to free the ends of the banding material from the banding head 56, drawing the ends to the outside of the coils, where, using conventional well known cutting, tightening and crimping tools, such as made by the Signode or Acme companies, the banding material 70 may be secured at opposite positions about the compressed coil. This banding of the compressed coils is illustrated at 72 in FIGS. 7 and 10.

With the compressed coils now secured, the pistons 30 may be retracted by cylinders 26 to return compactor 32 to the position shown in FIGS. 1 and 2. The pole P3 is now clear of compactor 32 and the banded coils have been pushed outwardly by springs 22 away from the fixed abutment face 16, as shown in FIG. 7. The hub 2 may now be rotated through another step so that the pole containing the compressed banded coils moves on to position P4. This is the position at which the banded coils are removed from the pole, weighed and then disposed of to await removal by the crane.

The mechanism for removing the banded coils from the pole at position P4 will be explained by reference to FIGS. 5, 6 and 10.

Through the use of suitable supports 74, there is provided a pair of parallel tracks 76 on which run the wheels 78 of a car 80. The tracks run under pole P4 from close to hub 2 to the weighing station. Car 80 includes a frame in the form of a pair of depending parallel rigidly connected plates 82, which between them support a vertically movable and guided post 84. The post is of relatively large horizontal dimensions to give it the necessary lateral stability that is required to meet the loads involved. Mounted on a bottom plate 86 (see FIG. 10), which is fixed with respect to side elements 82, is a hydraulic car lifting cylinder 88, the upper end of which engages as at 90 the under side of a car platform 92. Thus as the piston of the hydraulic car lifting cylinder 88 is extended upwardly, the car platform 92 will be correspondingly moved, all the while adequately guided and laterally maintained by the post 84 to which it is connected.

Supports 74 also carry chain tracks 94 on which run two continuous chains 96. The chains at the ends of the frame travel around pairs of sprockets 98 and 99. A motor and brake unit 100 (see FIG. 5) drives through chain 102 a shaft 104 on which sprockets 98 are mounted. Since motor 100 is reversible, the chains 96 can be caused to move in either direction. One of the chains 96 is connected at 106 to the hydraulic lift car 80 so that as the chain is driven first in one direction and then in the other the car can be moved along tracks 76 from the position shown at the left of FIG. 6 to the dotted line position at the right of FIG. 6. The hydraulic car lifting cylinder 88, being integral with car 80, likewise moves with the car. Means is provided in the form of a unit known in the trade as a power track 108 for supplying cylinder 88 with hydraulic fluid under pressure through the entire extent of the car travel. The hydraulic lines 109 leading to cylinder 88 are carried by flexible tracking and flexible hose lines which have their terminal ends in a lateral extension 110 which is fixed to car 80. The piping extends inwardly through this extension to reach cylinder 88 as indicated in FIG. 5. Thus no matter where car 80 may be stopped in its travel along tracks 76, the cylinder 88 may be actuated to raise or lower the car platform 92.

Referring now to FIGS. 5 and 6 again, when the pole reaches position P4, the banded coils C will be located directly above the platform 92 of car 80. The operator or automatic means then actuates appropriate valves so that the piston of cylinder 88 is extended upwardly causing platform 92 to engage the banded coils C and lift them upwardly to the position C' shown in FIG. 6 where they are free of pole P4. The car 80, through operation of motor 100, is then caused to travel along tracks 76 until the banded coils reach the new position C2 shown in FIG. 6, at which point they surround short pole PW. The piston of cylinder 88 is then lowered, allowing the coils C to rest on pole PW which is part of a weighing mechanism. This type of weighing device is well known in the trade and need not be explained except to say that it is of the cantilever type. When the platform 92 has dropped away from coils C to leave the coils hanging in a stationary position on pole PW, a recording of the weight of the banded coils will be made on a scale 112. This may be either an automatic printed recording or the operator may manually record the weight.

As soon as the coils have been weighed, the platform 92 is raised again through operation of cylinder 88 to lift the coils to position C2 free of pole PW. The car 80 is then moved in the opposite direction until the coils are clear of the end pole PW. The car is then dropped at a position where it will be immediately adjacent a car tilt cylinder 114 and a roll-off platform 116.

Figure 10:
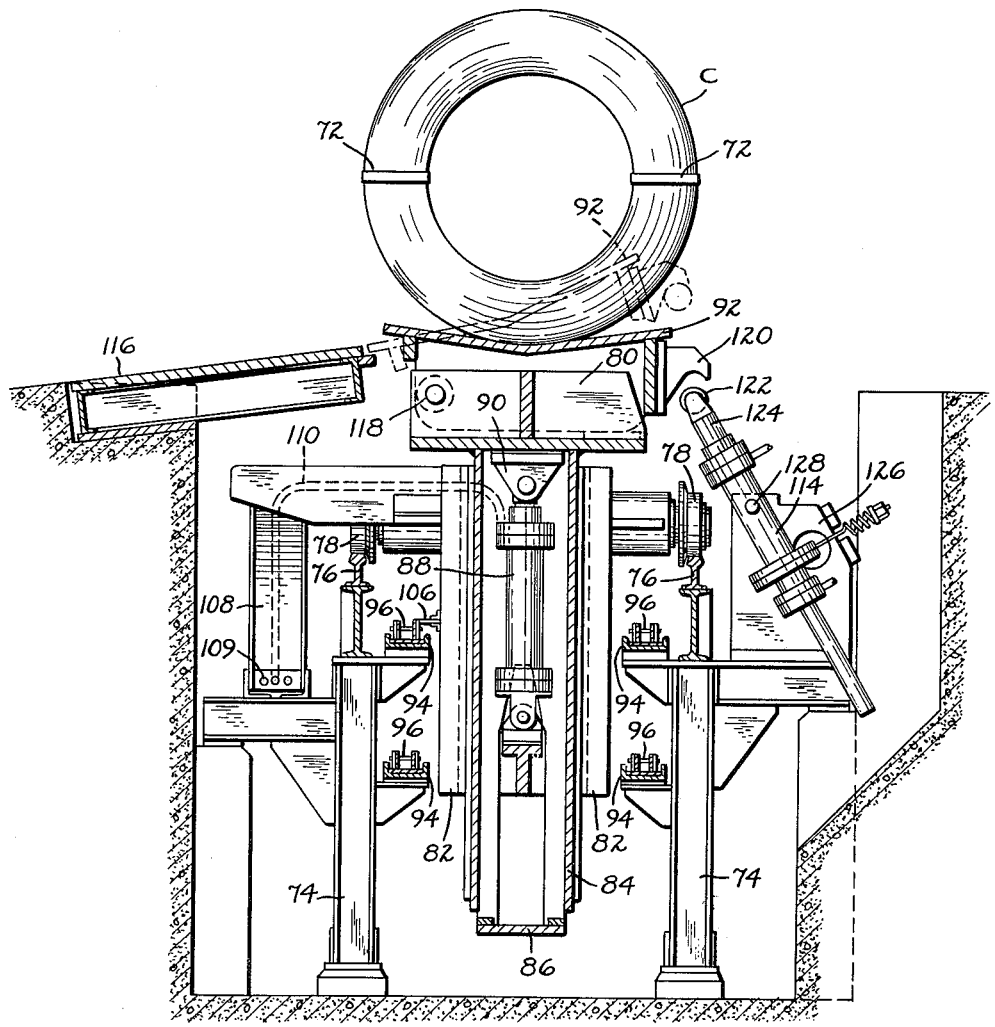
FIG. 10 is a vertical section on the line 10—10 of FIGS. 5 and 6 when the stripper car is at that position.

As can be seen in FIG. 10, platform 92 is pivoted at 118 and has on its opposite side a projection 120 adapted to engage a roller 122 on the end of piston 124 of car tilt cylinder 114.

Car tilt cylinder 114 is mounted on the supporting frame 126 by an appropriate pivot 128. Thus as the piston 124 is extended, roller 122 engages hook 120 to force the platform 92 to the tilted upper position indicated in dot-dash lines. This causes the banded coils C to roll laterally over platform 116 to a point on the adjacent floor where they are entirely clear of car 80 and the poles. The coils C thus discharged from the machine are now in a position to be picked up by a crane and taken to other positions for final disposition.

While the compacting and banding operation was taking place at position P3, eight coils were resting on the pole at position P2 and eight other coils were being deposited on the pole at position P1. As the compacted and banded coils moved from position P3 to the position P4 for removal and weighing the new set of coils arriving at position P3 were ready for compression and banding, while the previously banded coils were being removed at position P4. Similarly, a new set of coils were being placed on the new pole now at position P1 by the hook conveyor. From this explanation, it is believed clear that at each step in rotation of hub 2 a loading operation occurs at position P1, a compressing and banding operation occurs at position P3, and an unloading and weighing operation occurs at position P4.

Figure 11:
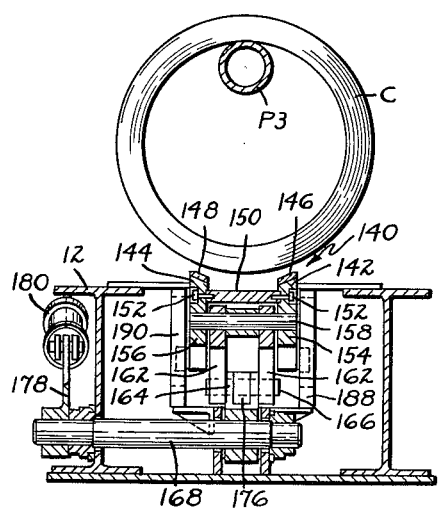
FIG. 11 is a view taken on the line 11—11 of FIG. 2 showing skid means for raising the coils clear of the pole during compacting and banding.
Figure 12:
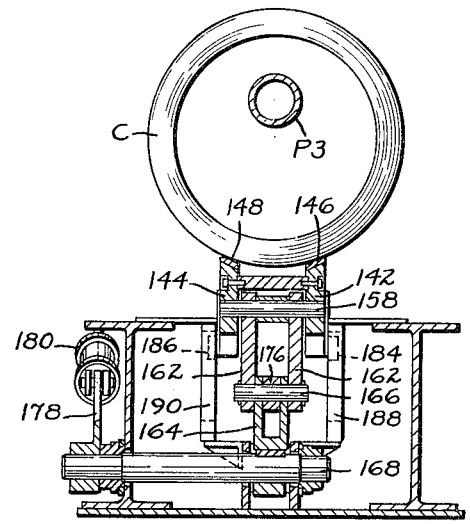
FIG. 12 is similar to FIG. 11 with the skid in raised position.
Figure 13:
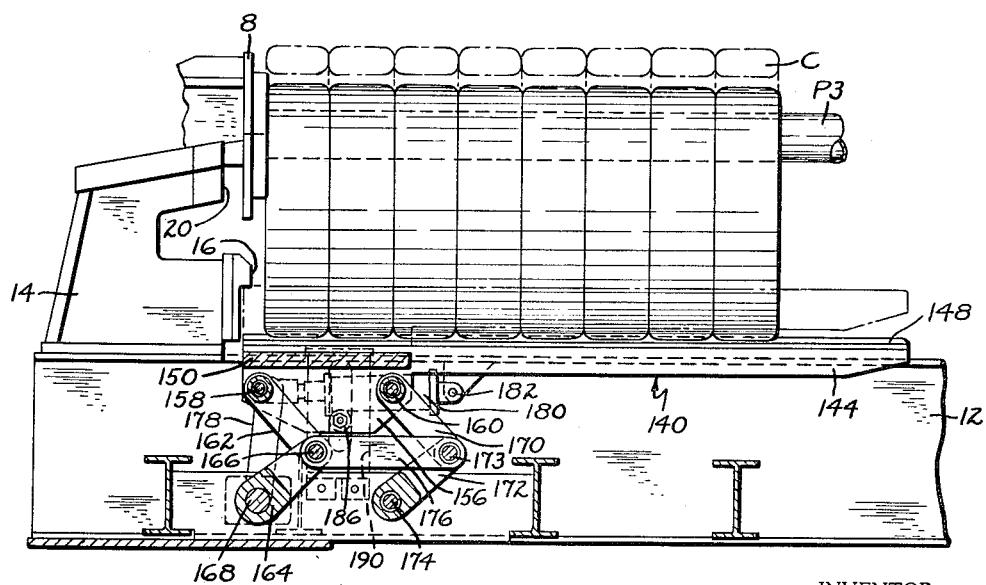
FIG. 13 is a side elevation of FIGS. 11 and 12.

In the description heretofore given of the compacting operation, the coils have been compacted while hanging directly on the pole. This is a generally satisfactory method, but there is some tendency for the coils to shift slightly out of alignment during the compacting operation and also the possibility that those portions of the rod directly engaging the pole may be scratched as the coils are pushed along the pole during the compacting step. Accordingly, an alternative mechanism has been provided as shown in FIGS. 11, 12 and 13 whereby the coils are simultaneously raised from the pole and maintained in alignment during the compacting operation. By this means, a package of coils is produced which is of superior configuration.

The construction shown in FIGS. 11, 12 and 13 for raising the coils will now be described. The mechanism is generally referred to as a skid and numbered 140. The skid comprises a pair of longitudinally extending members 142 and 144, each of which is covered on its upper surface with strips of wood 146 and 148. Members 142 and 144 are at least as long as the maximum number of coils that will be brought to the compacting station by the pole P3. The two members are affixed to a short horizontal plate 150 by bolts 152 to maintain them parallel. The downwardly extending portions 154 and 156 of members 142 and 144 are connected by two crosswise pivots 158 and 160. A first toggle mechanism comprising upper and lower links 162 and 164 connected by pivot 166 extends between pivot 158 and actuating shaft 168 and a second toggle mechanism comprising upper and lower links 170 and 172 connected by pivot 173 extends between pivot 160 and a pivot 174. These two toggles are connected by a horizontal link 176 attached to pivots 166 and 173. Link 164 is keyed to shaft 168, which shaft on its outer end has a crank arm 178 keyed thereon. A hydraulic or pneumatic cylinder 180 pivotally mounted at one end at 182 to the frame 12 and having its piston pivotally attached to crank arm 178 provides means for oscillating shaft 168. As the shaft 168 is turned from the position shown in FIGS. 11 and 13 to the position shown in FIG. 12, the toggle mechanism will be actuated to cause the bars 142 and 144 to move to elevated position as shown in FIG. 12. To make the skid travel vertically as it moves up and down, rollers 184 and 186 are attached to parts 154 and 156. These rollers are in vertical tracks in side plates 188 and 190. The dimensions of the parts are such that the wooden pads 146 and 148 will engage the coils C to lift them clear of the pole P3. In this raised position, the coils are still within the confines of the abutments between which they are to be compressed. As the compacting operation proceeds, the coils remain cradled on the elements 142 and 144 so that the package when banded is of good cylindrical configuration. As soon as the banding operation is finished, cylinder 180 will be actuated in the reverse direction to lower the skid to the position of FIG. 11 to return the coils C to their position on pole P3. The rest of the operation through the stripping, weighing and discharging stages is the same as heretofore described.

In the operation of the machine utilizing five poles, it has been found that eight coils can be loaded in the same interval that is required for the compressing and banding at station P3 and removal and weighing at station P4. To illustrate the present state of efficiency of the machine, the operations at the three working stations can be accomplished in 75 seconds, while 5 seconds is utilized in actuation of the hub to swing the poles from one position to the next, as from position P1 to position P2. The time of operation at each position may, of course, vary according to the number of coils being delivered by the conveyor per minute and the size and number of coils to be compressed and banded. These factors may be changed to suit mill requirements. The machine can be arranged to function automatically, or it can be placed under the direct control of one or more operators. It is thought, however, for the present that the operations should be preferably under manual control due to the fact that the banding operation is not as yet completely automatic. If and when the coils can be banded without human assistance, then all operations could readily be placed on an automatic cycling basis.

When reference herein is made to coils of rod, it is to be understood that this refers to coils of elongated metallic material of any diameter, including those smaller sizes which might be referred to as wire.

It is intended to cover all changes and modifications of the examples of the invention herein chosen for purposes of the disclosure which do not constitute departures from the spirit and scope of the invention.

I claim:

1. Means for compacting and banding a plurality of coils of rod, said means comprising a rotatable supporting hub whose axis is tilted from the vertical, three or more poles extending radially from said hub in fixed relation thereto and equally angularly spaced thereabout, the angle of each pole to the hub axis being the same and such that during rotation of the hub each pole swings from a maximum upwardly sloping position downwardly to a first horizontal position, then to a downwardly sloping position, then upwardly to a second horizontal position, and finally upwardly to said maximum upwardly sloping position, means for rotating said hub step-by-step and for stopping said hub for a predetermined time at a position in which two of said poles are horizontal and one of said poles is in maximum upwardly sloping position, means for feeding a predetermined number of coils onto a first pole which is in said maximum upwardly sloping position while the hub is stationary, means for compressing the said coils in an axial direction when said first pole has reached its first horizontal position and while another pole is at said maximum upwardly sloping position receiving another predetermined number of coils, means for drawing banding through said compressed coils for subsequent banding thereof to hold said coils in said compressed condition, and means for removing said compressed banded coils from said first pole when said first pole has reached and stopped at its second horizontal position and while still another pole is at said maximum upwardly sloping position receiving another predetermined number of coils.

2. The construction set forth in claim 1, said means for removing said compressed banded coils from said first pole when the pole is stopped at its second horizontal position comprising a car located under the said coils, means for raising said car to lift said coils free of said pole, and means for moving said car away from said hub in a direction parallel to the said pole.

3. Means for compacting and banding a plurality of coils of rod, said means comprising a rotatable supporting hub whose axis is tilted from the vertical, three or more poles extending radially from said hub and equally angularly spaced thereabout, the angle of each pole to the hub axis being the same and such that two of the poles may simultaneously extend horizontally from the said hub axis and another pole equi-angularly spaced away from said two poles may at the same time slope upwardly at the maximum angle achieved by the poles as they rotate about the hub axis, means for rotating said hub step-by-step and for stopping said hub for a predetermined time at the said position in which two of said poles are horizontal and one of said poles is in maximum upwardly sloping position, means for feeding a predetermined number of coils onto a first maximum upwardly sloping pole while the hub is stationary, means for compressing the said coils in an axial direction when said first pole has reached its first horizontal position, said means for compressing said coils comprising a fixed abutment adjacent the hub end of said pole at the first horizontal position and a resilient abutment on said rotatable hub farther from the hub axis than said fixed abutment, both abutments having faces at right angles to the pole axis for engaging the innermost coil on said pole, means for limiting movement of said resilient abutment toward said hub at a position in which the faces of said abutments are substantially aligned, and a coil compressing member having a face at right angles to said pole axis for engaging the outermost coil on said pole, means for driving said compressing member in a direction parallel to the said pole axis against said coils to compress the same and at the same time move the resilient abutment to the limit of its movement, means for drawing banding through said compressed coils for subsequent banding thereof to hold said coils in said compressed condition, said resilient abutment acting to move said banded coils outwardly along said pole as the compressing member is withdrawn, whereby the innermost coil of the banded coils will clear said fixed abutment when said first pole is rotated through the next step, and means for removing said compressed banded coils from said first pole when said first pole has reached and stopped at its second horizontal position.

4. Means for compressing and banding a plurality of rod coils that are side-by-side on a generally horizontal pole which extends from and is affixed to a rotatable hub, a fixed abutment adjacent the hub end of said pole having a face normal to the pole axis and in line with the lower part of the coils, a resilient abutment mounted on the inner end of said pole, said resilient abutment having a face normal to the pole axis and in line with the upper part of the coils, the resilient abutment face when unloaded having a position farther from the hub axis than the fixed abutment face, means limiting movement of said resilient abutment face in the direction of the hub to a position in which it is in substantially the same plane as the fixed abutment face, a compressing member having faces horizontally aligned with upper and lower parts of said coils and parallel to said abutment faces, a ram for driving said member against said coils and toward said abutments to cause alignment of the resilient abutment face with the fixed abutment face and to compress said coils therebetween, whereby said coils can then be banded in said compressed condition, said resilient abutment acting to move said banded coils outwardly along said pole as said ram is withdrawn, whereby the innermost coil of said banded coils will clear said fixed abutment upon rotation of said hub and pole.

5. The construction set forth in claim 4, and means for applying bands to said compressed coils, said means comprising a bander cylinder attached to said compressing member and movable toward and away from said coils, a piston in said cylinder parallel to said pole axis and movable to pass through said compressed coils when the piston is extended from said cylinder, means on the end of said piston for receiving and removably holding the ends of banding material whereby after the said band holding means has passed through said coils the ends of banding material may be introduced therein to thereafter be drawn by said piston toward said compressing member through the interior of said coils, thereby to facilitate the subsequent securing of the bands about said coils.

6. Means for compacting and banding a group of coils of rod while the coils are on a rotatable but temporarily stationary horizontal pole having a free end, said means comprising a fixed abutment remote from said pole end aligned with the lower part of said coils, a movable resilient abutment normally closer to said pole end and aligned with the upper part of said coils, means for limiting movement of said resilient abutment in the direction of the fixed abutment at a point where the faces of the fixed and resilient abutments will be in substantial vertical alignment, a compactor having vertical faces substantially aligned with the faces of the resilient abutment and fixed abutment, means for forcing said compactor toward said abutments to compress said coils therebetween, means movable back and forth through the interior of said compressed coils whereby banding material, on being attached to said movable means when at one end of said compressed coils, may be drawn through said coils by said movable means, said resilient abutment acting to move said coils away from said fixed abutment upon withdrawal of said compactor, whereby said coils will clear said fixed abutment upon rotation of said pole.

7. Means for receiving a plurality of coils of rod from a conveyor and for moving said coils subsequently to a compressing and banding position and thereafter to a stripping position, said means comprising a rotatable hub having a non-vertical axis, a plurality of poles extending from said hub in fixed relation thereto, said poles being equally spaced about said axis, the angle between each pole and the hub axis being the same, each of said poles during the course of rotation of said hub passing through two positions only in which the pole is horizontal, means at one of the said horizontal positions for compressing and banding coils on a pole when at that position, and means at the other horizontal position for removing compressed and banded coils from a pole when at that position.

8. In a machine of the type described comprising a plurality of equally spaced poles fixed in relation to and rotatable about a tilted axis so that each pole passes through two horizontal positions, means for removing a group of compressed and banded coils from a pole when the pole is in its second horizontal position, said means comprising a car normally positioned under said pole and the banded coils thereon, means for raising the upper portion of said car sufficiently to lift said coils from said pole, means for moving said car in a direction parallel to the axis of said pole to a position beyond the end of said pole, and means for discharging said banded coils from said car to an adjacent area.

9. Means for receiving a plurality of coils of rod from a conveyor and for moving said coils subsequently to a compressing and banding position and thereafter to a stripping position, said means comprising a rotatable hub having a non-vertical axis, a plurality of poles extending from said hub in fixed relation thereto, said poles being equally spaced about said axis, the angle between each pole and the hub axis being the same, each of the said poles during the course of rotation of said hub passing through two positions in which the pole is horizontal, means at the first of said horizontal positions for compressing and banding coils when at that position, means located beneath the coils at said first horizontal position for raising the coils out of engagement with said pole and for maintaining the coils in substantial axial alignment prior to and while they are being compressed by said compressing means, said means for raising the coils also acting to lower the coils to their original position on said pole after they have been compressed and banded, and means at the second of said horizontal positions initially located under said coils for first lifting and then removing the compressed and banded coils from said pole when at that second position.

10. Means for compressing a group of coils of rod for the purpose of banding the coils when in compressed condition, said means comprising a pole rotatable about a fixed tilted axis, said coils initially in hanging position on said pole when it is temporarily in a stationary horizontal position, said means comprising an abutment near one end of said pole having its face normal to the pole axis, movable compacting means at the other end of said pole adapted to compress said coils against said abutment, means located under the coils for simultaneously raising all of the coils vertically a limited distance to be free of engagement with said pole and to hold said coils in more precise axial alignment while the pole is still within said coils and while the coils are being compressed by said compacting means.

11. The structure set forth in claim 10, said means for raising the coils from said pole comprising a pair of spaced parallel arms longer than the uncompacted length of the coils on said pole, means for moving said arms simultaneously up and down, the extent of the movement of said arms being from a position below the bottom of said coils when the coils are hanging on said pole to an uppermost position at which the coils will rest on said arms and be free of engagement with said pole and be between and in horizontal alignment with said abutment and compacting member.

References Cited by the Examiner
UNITED STATES PATENTS

| | | | |
|---|---|---|---|
| 2,822,086 | 2/58 | Franks | 100—3 X |
| 2,883,925 | 4/59 | Pritchard et al. | 100—3 X |
| 2,920,555 | 1/60 | Sherriff | 100—3 X |
| 2,926,598 | 3/60 | Dentzer et al. | 100—3 X |
| 3,129,658 | 4/64 | Valente | 100—218 |

FOREIGN PATENTS

| | | |
|---|---|---|
| 1,049,294 | 1/59 | Germany. |

WALTER A. SCHEEL, *Primary Examiner.*